(12) United States Patent
Aftelak

(10) Patent No.: US 6,658,075 B1
(45) Date of Patent: Dec. 2, 2003

(54) SYNCHRONIZATION LOCK DETECTOR AND METHOD

(75) Inventor: Andrew John Aftelak, Basingstoke (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/492,374

(22) Filed: Jan. 27, 2000

(30) Foreign Application Priority Data

Feb. 13, 1999 (GB) .............................................. 9903178

(51) Int. Cl.[7] .............................. H03D 3/24; H03L 7/00
(52) U.S. Cl. ...................... 375/375; 375/354; 375/373
(58) Field of Search .................................. 375/375, 147, 375/148, 149, 216, 260, 225, 262, 354, 373, 371; 370/335; 455/69

(56) References Cited

U.S. PATENT DOCUMENTS

| | | | | |
|---|---|---|---|---|
| 5,870,427 A | * | 2/1999 | Tiedemann, Jr. et al. ... | 375/216 |
| 5,907,583 A | * | 5/1999 | Sakoda et al. ............... | 375/260 |
| 6,055,415 A | * | 4/2000 | Suzuki ......................... | 455/69 |
| 6,222,878 B1 | * | 4/2001 | McCallister et al. ......... | 375/225 |
| 6,243,423 B1 | * | 6/2001 | Sakoda et al. ............... | 375/262 |
| 6,377,640 B2 | * | 4/2002 | Trans .......................... | 375/354 |
| 6,456,608 B1 | * | 9/2002 | Lomp .......................... | 370/335 |

FOREIGN PATENT DOCUMENTS

| | | |
|---|---|---|
| EP | 0767557 A1 | 4/1997 |
| EP | 0794635 A2 | 9/1997 |

* cited by examiner

*Primary Examiner*—Stephen Chin
*Assistant Examiner*—Sam K. Ahn
(74) *Attorney, Agent, or Firm*—Steven R. Santema; Valerie M. Davis

(57) ABSTRACT

A frame timing lock detector circuits and a methods of frame timing lock detection for a digital communications system. A known data sequence is extracted from a received radio signal and multiplied, in a multiplier, together with a reference signal that includes the symbols of the known data sequence raised to the power of a multiple of three. The phase of the multiplier output is measured and an average of an absolute value of this measured phase is compared with a threshold to detect correct frame timing lock.

21 Claims, 3 Drawing Sheets

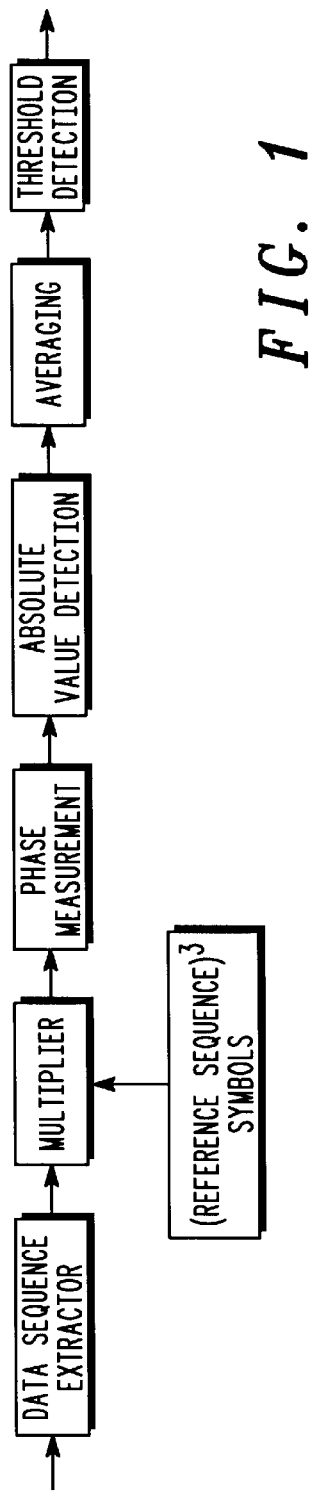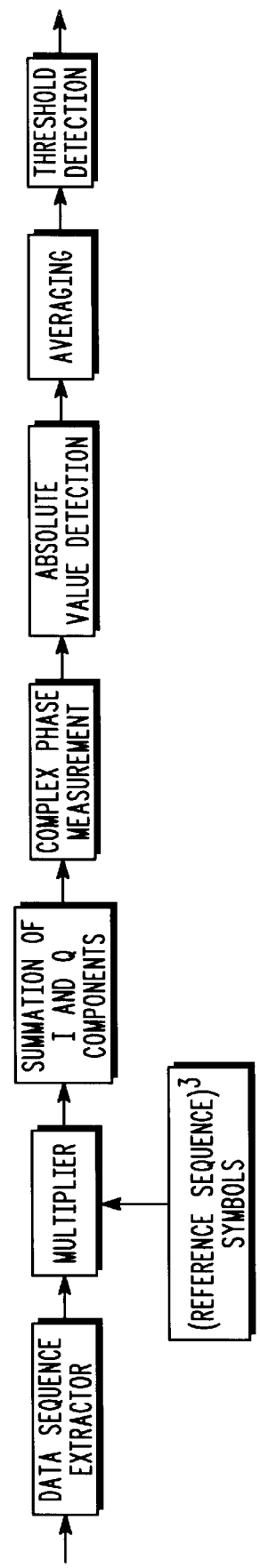

SYNCHRONIZATION LOCK DETECTOR AND METHOD

TECHNICAL FIELD

The invention relates to the field of mobile radio communications.

BACKGROUND

Radio communication systems employing digital signalling are becoming increasingly common. The information carried by any digital communication system can be recovered only after the receiver has first synchronised to the received signal. Thus there is a need in a mobile digital radio system for synchronisation in the radio receiver.

Synchronisation, in the sense used here, means that the radio receiver has to know:

a) When is the best time to sample the received signal to recover the bits carried by each symbol. This is 'symbol synchronisation'.

b) Where each block of symbols starts and ends in time. This is 'frame synchronisation'.

c) What the carrier frequency of the received signal is, if the signalling employed in the communication system is based on using a carrier signal. This is 'frequency control'.

A state of synchronism is often simply referred to as 'lock'.

Several Time Division Multiple Access (TDMA) type digital radio communications systems are known, such as 'TETRA', 'GSM' or 'IS54'. In TDMA systems the received signal carries sequences of known, predetermined symbols, which are termed 'training sequences'. The training sequences are used by the receiver to estimate the symbol & frame timing phase and the carrier frequency offset. These training sequences therefore allow the receiver to achieve synchronism.

The algorithms used to achieve synchronism are typically based on 'maximum likelihood' theory. For symbol and frame timing recovery, maximum likelihood theory is applied by correlating the symbol wave-form or training sequence waveform with the actual received signal over a block of data. Clearly, the actual signal received may have been corrupted by additive 'noise' or distorted by the communication channel. Furthermore, the receiver clearly must apply the maximum likelihood technique at a time when it is not yet synchronised to the training sequence, although the values of the training sequence wave-form are known to the receiver. The assumed correct timing phase is taken as being the phase for which there is a maximum value of the correlation.

An automatic frequency control (AFC) circuit in a radio receiver adjusts the reference frequency used within the receiver to match the carrier frequency of the received signal. An automatic frequency control circuit can use the derivative of a maximum likelihood function to drive the reference frequency used within the receiver to lock. The derivative of the maximum likelihood function is zero at the lock point.

The arrangements detailed above relate to how synchronisation is achieved within a radio receiver.

Besides actually achieving synchronisation however, it is extremely useful for the receiver to know accurately at any time whether or not a state of synchronisation has yet been reached. In particular, the receiver should have some indication of the reliability of the timing phase found, and to know when the frequency loop has locked. This is because a receiver may approach a state of synchronisation in steps. Also, it is sometimes possible for a receiver's synchronisation circuitry to adopt the mode of operation appropriate to when synchronisation has been achieved, even though synchronisation has not in fact been achieved.

For example, the synchronisation circuitry will find a maximum of the correlation when the received signal is entirely absent. This anomalous value of correlation is due to the nature of the maximum likelihood approach to symbol and frame timing recovery. If the received signal is absent but the receiver then mistakenly assumes from the finding of maximum correlation that synchronisation has been attained, then clearly the receiver would continue decoding the data without knowing if the signal is there, or whether it had found the correct phase. To operate effectively therefore, the receiver requires some form of lock detector, both for timing recovery and frequency synchronisation.

The performance of the lock detector is in fact critical to the performance of the synchroniser. The lock detector must reliably reject a synchronisation indication when no signal is present or when a false synchronisation position is found. Otherwise, the receiver will waste time and battery power trying to decode non-existent signals. The action of mistakenly accepting a false state of synchronisation is termed 'falsing'. A good synchronisation lock detector must therefore have a low rate of falsing. A lock detector must also reliably recognise and accept a correct synchronisation, for the receiver to reliably set up calls. These two requirements are generally conflicting. Therefore a good lock detector is one which finds a good compromise between having a low falsing rate and low rejection of good locks.

The radio units in a public or private mobile radio communications system are often referred to as 'mobile stations'. Normally, a mobile station is within communication range of a base station of the communication system's infrastructure. In this case, the mobile station will communicate through the base station, this mode of operation typically being termed 'trunked mode'. However, some mobile radio communication systems allow an individual mobile station to set up a direct radio link to another mobile station, without the communication link passing through the infrastructure, for example a base station, of the communication system. This form of communication between two mobile stations is referred to as 'Direct Mode' operation.

Mobile stations operating in direct mode have to receive radio signals which typically show greater variation in their parameters than radio signals received from the infrastructure of the communications system. This is because of differences in the signals transmitted from a mobile station in comparison to those from a base station of the infrastructure, and signal path differences. For example, a) A mobile station may only transmit with low or variable power;

b) A mobile will typically have a lower quality internal clock than a base station;

c) A mobile may be moving, but a base station is stationary, movement of the mobile introducing characteristics such as Rayleigh fading to the signal;

d) A mobile may suffer interruption of its transmission due to passing by an obstruction, low power or poor battery contacts. As these factors don't affect a base station, the base station will suffer interruption of its broadcast signal less often.

The above factors make the need for accurate synchronisation, and recognition of synchronisation, particularly important for direct mode operation of mobile stations.

Several circuit arrangements that enable a radio receiver to establish synchronisation are known in the prior art. Examples of these circuit arrangements are explained briefly below, under the headings 'frame timing recovery' and 'frequency lock detection'.

Frame Timing Recovery

Two techniques are known for frame timing recovery:

1) Motorola sells TETRA radios under the system name 'Dimetra'. The Dimetra trunked mode algorithm is an example of a prior art technique for frame timing recovery. This algorithm compares the correlation value with the received signal energy. This algorithm works well when the mobile radio is communicating in trunked mode, because the mobile radio is more likely to be receiving a signal.

The algorithm must be capable of rejecting noise-like signals. These occur more in direct mode operation than in trunked mode operation. In fact, the algorithm must discriminate very well against noise-like signals for direct mode operation.

2) The second technique for frame timing recovery involves always accepting the lock, attempting to decode the data, and relying on the error coding in the received data to reject false locks. The received data has 'CRC' coding (cyclic redundancy coding) to enable the receiver to recognise errors in the data. The problem with this technique is that the receiver does not reject a false lock early enough in this process. The receiver therefore wastes time and battery power decoding the data.

Frequency Lock Detector

Frequency lock detectors are not well documented. Most carrier lock detectors actually detect phase lock. A common approach to detecting frequency lock is merely to allow the automatic frequency control (AFC) loop to run for a certain amount of time, and then simply assume that lock must have been achieved in that time. This wastes time and is not reliable.

A need exists to alleviate the problems of the prior art.

BRIEF DESCRIPTION OF THE DRAWINGS

FIG. 1 illustrates a frame timing lock detector in accordance with the present invention.

FIG. 2 illustrates a frequency lock detector in accordance with the present invention.

DETAILED DESCRIPTION OF THE PREFERRED EMBODIMENT

Figure 3:
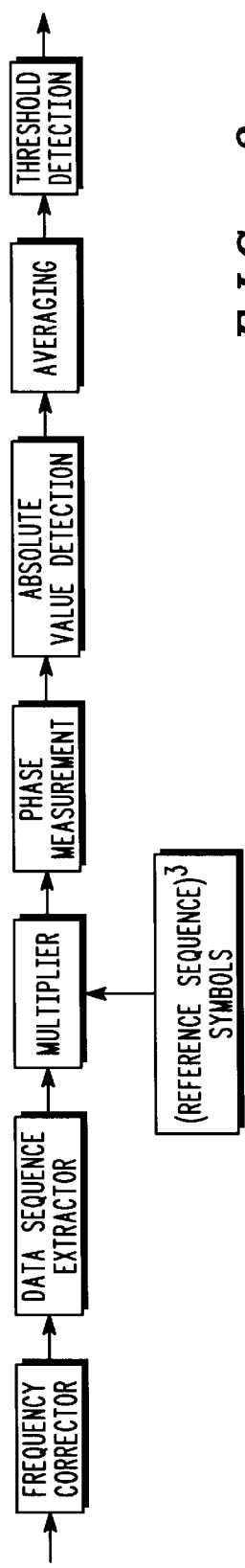
FIG. 3 illustrates a further embodiment of a frame timing lock detector in accordance with the present invention.

In accordance with the present invention, a frame timing lock detector circuit for a digital communications system comprises:

a) means for extracting known data sequences from a received radio signal;

b) means for supplying a reference signal, the reference signal comprising the symbols of the known data sequences raised to the power of 4k+3, where k is zero or an integer;

c) a multiplier receiving the reference signal at a first input, and the known data sequences extracted from the received signal at a second input;

d) a phase measurement circuit connected to the output of the multiplier for measuring the phase of the signal output by the multiplier; and e) a detection circuit, connected to the output of the phase measurement circuit, for comparing the average of the absolute value of the measured phase with a threshold, thereby detecting correct frame timing lock.

The present invention also extends to a communications receiver which comprises a frame timing lock detector with features a)–e) above.

Also in accordance with the present invention, a method of frame timing lock detection for a digital communications system comprises:

a) extracting known data sequences from a received signal;

b) supplying a reference signal, the reference signal comprising the symbols of the known data sequences raised to the power of 4k+3, where k is zero or an integer;

c) multiplying together the reference signal and the known data sequences extracted from the received signal;

d) measuring the phase of the output of the multiplier; and e) comparing the average of the absolute value of the measured phase with a threshold, thereby detecting correct frame timing lock.

In accordance with the present invention, a frequency lock detector circuit for a digital communications system comprises:

a) means for extracting known data sequences from a received signal;

b) means for supplying a reference signal, the reference signal comprising the symbols of the known data sequences raised to the power of 4k+3, where k is zero or an integer;

c) a multiplier receiving the reference signal at a first input, and the known data sequences extracted from the received signal at a second input;

d) a summation circuit connected to the output of the multiplier for summing the I-components and for summing the Q-components of the signals output by the multiplier;

e) a complex phase measurement circuit connected to the output of the summation circuit for measuring the value of the complex phase difference between the reference signal and the known data sequences extracted from the received signal;

f) a detection circuit, connected to the output of the phase measurement circuit, for comparing the average of the absolute value of the measured complex phase difference with a threshold, thereby detecting correct frequency lock.

The present invention also extends to a communications receiver which comprises a frequency lock detector with features a)–f) above.

Also in accordance with the present invention, a method of frequency lock detection for a digital communications system comprises:

a) extracting known data sequences from a received signal;

b) supplying a reference signal, the reference signal comprising the symbols of the known data sequences raised to the power of 4k+3, where k is zero or an integer;

c) multiplying together the reference signal and the known data sequences extracted from the received signal;

d) summing the I-components and summing the Q-components of the signals output by the multiplier;

e) measuring the value of the complex phase difference between the reference signal and the known data sequences extracted from the received signal;

f) comparing the average of the absolute value of the measured complex phase difference with a threshold, thereby detecting correct frequency lock.

The apparatuses and methods of the invention provide several advantages. The technical performance of the lock detectors and methods of the invention are vastly superior over current techniques in:

(i) rejecting noise-like signals; and (ii) recognising true lock conditions.

Both the frame timing lock detector and the frequency lock detector of the invention allow very reliable performance well below nominal receiver sensitivity. The detector can in fact detect and lock onto signals which are much weaker than the minimum signal strength which a receiver must detect in order to be compliant with the TETRA standard. Radios employing the inventive lock detectors can detect and set-up calls very quickly. These radios are also able to detect, set-up and maintain calls when the received signal level is low. Therefore radios employing the inventive lock detectors will particularly out-perform prior art TETRA systems in direct mode operation.

This invention specifically aims at finding a synchronisation lock detector. The inventive principle is applicable to detecting both frame timing lock and frequency lock.

The invention is particularly applicable to the lock detectors for TETRA direct mode radio operation, both for frame timing lock and for frequency lock. However, the apparatus and the algorithms of the invention are applicable generally to communication systems which employ known data sequences, or 'training sequences'.

The specific problems faced for TETRA direct mode are:

1) The frame timing algorithm must operate well during the first few slots of received data for fast call set-up to be possible. The frame timing lock detector should detect lock within a single slot of data to indicate the reliability of each slot, and should have a low rejection rate of good locks.

2) One example of a prior art trunked mode lock detector can be set to have a falsing rate of 6% for an input signal consisting of white noise. This means that with no signal input, the lock detector will flag that a direct mode signal is present for 6% of the slots processed. This receiver, with this setting, will however only flag a correct lock 43% of the time, even though the frame timing algorithm is finding the correct timing phase nearly 100% of the time. Clearly, the lock detector is degrading the performance of a very good synchronisation algorithm.

3) The automatic frequency control loop drives a control signal to zero. An average of this control signal would be a good lock detector, except that it is very difficult to threshold a signal being driven to zero for use as a lock detector. The present invention recognises that a good lock detector signal is one which exceeds a threshold, rather than one which falls below a threshold.

The proposed frame timing lock detector and frequency lock detector of the present invention are both based on the same inventive technique. This technique is as follows:

Firstly, the symbol and frame timing are recovered and the signal is decimated to one sample per symbol, and differentially decoded.

All the known training sequences within the received signal are extracted from the received signal. The recovered frame timing phase indicates the respective positions of the known training sequences within the captured data.

A mathematical representation of a sample of the received signal after differential decoding at the symbol timing point is given by:

where $\theta$ is the phase of the data given by $n\pi/4$, where n is $\pm 1$ or $\pm 3$, and $\phi$ is a phase related to the frequency offset of the carrier.

The lock detector of the invention operates by complex multiplying each symbol in the training sequences extracted from the received signal with the corresponding complex symbol from a local copy of the training sequence raised to the power 3 or 'cubed'. The invention differs from prior art arrangements in this multiplication of the received training sequence with the cubed reference sequence.

In fact, the invention can operate by multiplication of the received training sequence with the symbols of the reference sequence raised to the power of (4k+3), where k is zero or any integer value. Although the invention works for values of k=1, k=2, k=3 etc., for simplicity of discussion this description considers in detail the case of k=0, i.e. where 4k+3=3 and the symbols of the reference training sequence are cubed. This is a preferred embodiment of the broader invention.

In the case where the symbols of the reference training sequence are cubed, the phase of the cubed reference symbol will be $3\theta$. Therefore, if the recovered frame timing is correct, the phase of the product will be $\pm\pi+\phi$. The invention uses detection of the attainment or otherwise of this condition to give an indication whether or not frame timing is correct. If the frame timing is not correct and signal is present, then the phase of the product will be $\pm m\pi/2+\phi$, where m is 0, 1, 2 or 3. If no signal is present then the phase of the product will be distributed randomly between $+\pi$ and $-\pi$ with a flat distribution.

The invention uses this knowledge of the phase of the product of the received training sequence and the cubed reference. In particular, the invention uses this knowledge to make a frame timing lock detector and a frequency lock detector.

The training sequence in the received signal is used by the invention as explained above because the training sequence is already present in a GSM signal. However, the invention can use any known data bits in the received signal in place of the training sequence. Thus the invention defined in the appended claims refers to 'known data sequences', one example of these being the GSM training sequences.

The skilled person would also be able to use any predetermined data sequence in the received signal in place of the known data sequence. However, this would make generation of the reference signal in the receiver more difficult. It might for example require a delay element in order to provide time for generation of the 'reference signal' from predetermined bits of data as they are received.

In accordance with the invention, a frame timing lock detector circuit for a digital communications system comprises:

a) means for extracting known data sequences from a received radio signal;

b) means for supplying a reference signal, the reference signal comprising the symbols of the known data sequences raised to the power of 4k+3, where k is zero or an integer;

c) a multiplier receiving the reference signal at a first input, and the known data sequences extracted from the received signal at a second input;

d) a phase measurement circuit connected to the output of the multiplier for measuring the phase of the signal output by the multiplier; and e) a detection circuit, connected to the output of the phase measurement circuit, for comparing the average of the absolute value of the measured phase with a threshold, thereby detecting correct frame timing lock.

The present invention also extends to a communications receiver which comprises a frame timing lock detector with features a)–e) above.

The frame timing lock detector circuit preferably employs a reference signal comprising the symbols of the known data sequences raised to the power of 3 or 'cubed', i.e. the value of k is zero.

The known data sequences may comprise the training sequences of a Time-Division Multiple Access (TDMA) signal, such as those of a GSM or TETRA communications signal as described above.

The reference signal within the frame timing lock detector may be generated by feeding a stored copy of the reference signals into a digital circuit to provide the symbols raised to the power of three. Alternatively, the lock detector can pre-store a copy of the reference signal with each symbol raised to the power of three.

The frame timing lock detector circuit may have its detection circuit adapted to perform detection over the known data sequences in a single slot of the received signal. In this case an indication of correct frame timing lock is possible from the first slot received of a received radio signal. Such a response time is much less than that in prior art frame timing lock detectors.

The detection circuit of the frame timing lock detector circuit may comprise, in sequence, an absolute value detection circuit, an averaging circuit and a threshold detection circuit. The threshold detection circuit of the frame timing lock detector may detect lock by comparing the average of the absolute value of the measured phase with a threshold value between $\pi$ radians and $\pi/2$ radians, and the detection circuit may be adapted to employ hysteresis in this threshold detection. Although expressed here in radians, an equivalent measure of phase such as degrees may be used instead.

A frequency correction circuit may precede the means for extracting the known data sequences from the received signal. Also, circuitry may be provided to supply the multiplier optionally with the known data sequences, in place of the known data sequences raised to the power of three, and simultaneously to by-pass the phase measurement circuit.

In accordance with the invention, a method of frame timing lock detection for a digital communications system comprises:

a) extracting known data sequences from a received signal;

b) supplying a reference signal, the reference signal comprising the symbols of the known data sequences raised to the power of 4k+3, where k is zero or an integer;

c) multiplying together the reference signal and the known data sequences extracted from the received signal;

d) measuring the phase of the output of the multiplier; and e) comparing the average of the absolute value of the measured phase with a threshold, thereby detecting correct frame timing lock.

The value of k is preferably zero, whereby the reference signal comprises the symbols of the known data sequences raised to the power of three.

Further in accordance with the invention, a frequency lock detector circuit for a digital communications system comprises:

a) means for extracting known data sequences from a received signal;

b) means for supplying a reference signal, the reference signal comprising the symbols of the known data sequences raised to the power of 4k+3, where k is zero or an integer;

c) a multiplier receiving the reference signal at a first input, and the known data sequences extracted from the received signal at a second input;

d) a summation circuit connected to the output of the multiplier for summing the I-components and for summing the Q-components of the signals output by the multiplier;

e) a complex phase measurement circuit connected to the output of the summation circuit for measuring the value of the complex phase difference between the reference signal and the known data sequences extracted from the received signal;

f) a detection circuit, connected to the output of the phase measurement circuit, for comparing the average of the absolute value of the measured complex phase difference with a threshold, thereby detecting correct frequency lock.

The present invention also extends to a communications receiver which comprises a frequency lock detector with features a)–f) above.

The frequency lock detector circuit preferably employs a reference signal comprising the symbols of the known data sequences raised to the power of 3 or 'cubed', i.e. the value of k is zero.

The complex phase measurement circuit of the frequency lock detector may be adapted to provide one measured value of the complex phase difference for the known data sequences in each slot of the received signal, and the averaging circuit may provide a value of the complex phase difference averaged over a plurality of slots of the received signal.

The detection circuit of the frequency lock detector circuit may comprise, in sequence, an absolute value detection circuit, an averaging circuit and a threshold detection circuit.

The detection circuit of the frequency lock detector may detect lock by comparing the average of the absolute value of the measured complex phase difference with a threshold value of $\pi-\phi1$ radians, or an equivalent measure of phase, where $\phi1$ is a predefined acceptable value of frequency offset. The detection circuit is preferably adapted to employ hysteresis in the threshold detection.

The known data sequences may comprise the training sequences of a Time-Division Multiple Access (TDMA) signal, such as those of a GSM or TETRA communications signal.

In a further embodiment of the frequency lock detector circuit of the invention, the frequency lock detector circuit may comprise a frequency correction circuit preceding the means for extracting the known data sequences from the received signal.

The frequency lock detector circuit may comprise means to supply the multiplier optionally with the known data sequences, instead of the known data sequences raised to the power of three, and simultaneously to by-pass the summation- and complex phase measurement circuits.

In accordance with the invention, a method of frequency lock detection for a digital communications system comprises:

a) extracting known data sequences from a received signal;

b) supplying a reference signal, the reference signal comprising the symbols of the known data sequences raised to the power of 4k+3, where k is zero or an integer;

c) multiplying together the reference signal and the known data sequences extracted from the received signal;

d) summing the I-components and summing the Q-components of the signals output by the multiplier;

e) measuring the value of the complex phase difference between the reference signal and the known data sequences extracted from the received signal;

f) comparing the average of the absolute value of the measured complex phase difference with a threshold, thereby detecting correct frequency lock.

The value of k is preferably zero, whereby the reference signal comprises the symbols of the known data sequences raised to the power of three.

FIGS. 1–6 show illustrative embodiments of the present invention.

FIG. 1 shows a frame timing lock detector in accordance with the invention.

In the arrangement in accordance with FIG. 1, the received signal is fed into a mixer. The other input of the mixer is a signal consisting of the cubed values of the symbols of training sequences.

The output of the mixer is connected to a phase measurement circuit. The phase measurement circuit determines the phase of the product of each symbol with the cube of the symbol.

The output of the mixer is connected to an absolute value detection circuit, which is followed by an averaging circuit. The absolute value detection of the phase is taken to remove the ±π discontinuity. The averaging circuit then averages the measured phase over the training sequences available in the recovered data.

The output of the averaging circuit is connected to a threshold detection circuit.

If the correct frame timing has been recovered, then the absolute value of the phases of the products:

abs (phases of the products)

will average to $\pi-\phi$.

If the correct frame timing has not been recovered, then the phases will average to $\pi/2$. Hence, the arrangement of FIG. 1 determines a frame timing lock by thresholding the averaged phase between $\pi$ and $\pi/2$. The threshold detection circuit performs this operation.

Because the average phase is calculated over the training sequences in a single slot of the received radio signal, a frame timing lock detector in accordance with the invention gives an indication of correct lock from the very first slot of the radio signal received.

FIG. 2 shows the frequency lock detector.

Many of the elements of the frequency lock detector of FIG. 2 correspond to those of the frame timing lock detector of FIG. 1. These elements will not be described again here.

The frequency lock detector of FIG. 2 does however show a summation circuit immediately after the mixer. The summation circuit produces separate totals for the I components and the Q components of the signals which it receives from the multiplier. These components are then passed to a complex phase measurement circuit.

The frequency lock detector averages the products of the training sequences over one slot by averaging the complex products. The frequency lock detector only generates one phase measurement per slot. This is a more effective way of averaging the Gaussian noise added to the received signal than was the case with the frame timing detector. However, the frequency lock detector does not give a lock indication from only one slot. The phases from each slot are averaged over a number of slots to give a frequency lock value.

FIG. 3 shows a further embodiment of the frame timing lock detector of the present invention. The embodiment of FIG. 3 differs from that shown in FIG. 1 in that the received radio signal undergoes a further pre-treatment stage before being fed to the mixer. This pre-treatment consists of applying a frequency correction to the received signal.

In the embodiment of FIG. 1, the frequency offset which gives rise to the phase angle $\phi$ degrades the quality of the lock signal. The further embodiment of the lock detector of FIG. 3 can ameliorate this degradation. In the embodiment of FIG. 3, a frequency correction is applied to each slot of the received signal before the signal is fed to the mixer.

The performance of the frame timing lock detector in accordance with the invention is very good.

Comparing with the prior art energy—based lock detector described above, which achieved correct lock indication only 43% of the time, the new frame timing lock detector has in practice indicated lock 99.8% of the time. This performance of the frame timing lock detector in accordance with the invention was achieved with a falsing rate of less than 0.1% for white-noise input.

Figure 4:
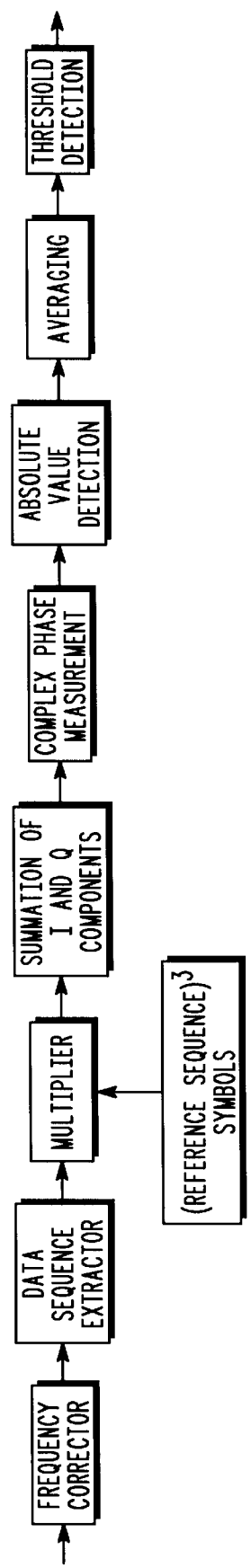
FIG. 4 illustrates a further embodiment of a frequency lock detector in accordance with the present invention.

FIG. 4 shows a further embodiment of a frequency lock detector in accordance with the invention. The frequency lock detector of FIG. 4 corresponds broadly to that of FIG. 2. However, the frequency lock detector of FIG. 4 has a frequency correction circuit connected in advance of the mixer. The reasons for this are explained in connection with FIG. 3 above.

Figure 5:
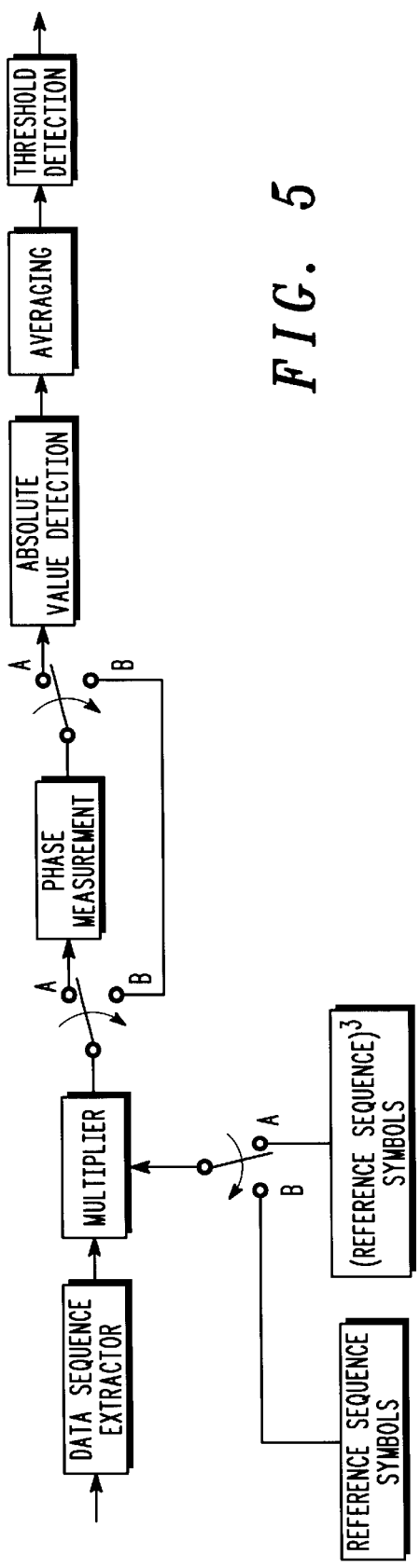
FIG. 5 illustrates another embodiment of a frame timing lock detector in accordance with the present invention.

FIG. 5 shows another further embodiment of the frame timing lock detector of the invention. Elements of the embodiment of FIG. 5 which are common to the embodiment of FIG. 1 will not be described again here.

In the arrangement of FIG. 5, three switches are shown. One switch is connected in the path between the supply of the cubed symbols of the reference signal and the input to the mixer. Another switch is connected in the path between the output of the mixer and the phase measurement circuit. The final switch is connected between the output of the phase measurement circuit and the input of the absolute value detection circuit.

FIG. 5 also shows a signal pathway which can supply the known reference symbol sequences to the mixer. In parallel to the phase measurement circuit, there is also a signal pathway which can short-circuit or 'bypass' the phase measurement circuit.

When all three switches are in the positions labelled 'A' in FIG. 5, the arrangement of FIG. 5 will function as described above in connection with FIG. 1. However, all three switches can be switched together to a second position, position 'B'. This occurs in dependence on the radio signal currently reaching the receiver, which provides the input to the mixer. This dependence is explained in detail below.

With the three switches of the arrangement of FIG. 5 in the positions B, there are two functional differences in comparison to the function of the circuit with the switches in the position A. These functional differences are that:

(i) The mixer is fed with a signal comprising only the symbols of the reference sequence, not the cubed values of these symbols.

(ii) The phase measurement circuit is bypassed. The output of the mixer therefore flows directly to the absolute value detection circuit.

Under certain conditions of the received radio signal the frame lock detector functions more reliably in the mode where all three switches are in position B. In fact, this mode corresponds to the normal mode of function of an energy based frame timing lock detector in accordance with the prior art. However, it is notable that the arrangement of FIG. 5 can optionally select to function either as shown in FIG. 1 or analogously to the circuit of the prior art, in dependence on the received radio signal.

The mode of function of the circuit of FIG. 5 can, for example, be as follows:

(i) Initially, all three switches in FIG. 5 remain in positions A. The circuit functions as did the arrangement of FIG. 1. This allows good rejection of white noise inputs. Therefore the circuit can quickly and reliably detect that a signal is present.

(ii) Next, the switches all move over to positions 'B'. This configures the circuit as an energy based lock detector. This arrangement has a high success rate in detecting correct lock, under the pre-condition that there is a signal present, which the mode described under (i) above has already checked.

The three switches of FIG. 5 can equally well be incorporated into the arrangement of FIG. 3.

Figure 6:
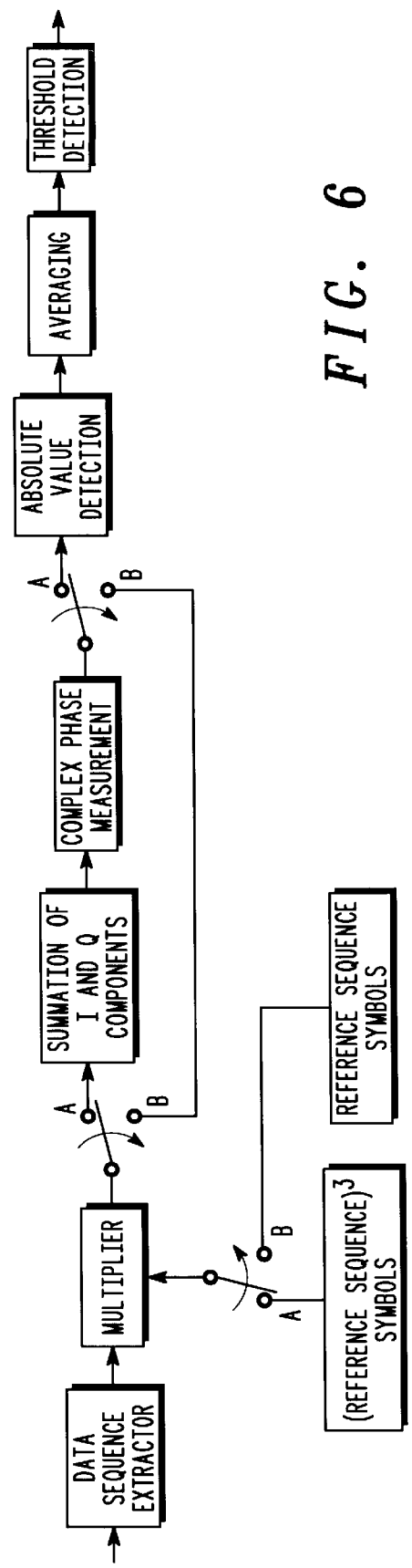
FIG. 6 illustrates another embodiment of a frequency lock detector in accordance with the present invention.

FIG. 6 shows a further embodiment of the frequency lock detector of the invention. Elements of the embodiment of FIG. 6 which are common to the embodiment of FIG. 2 will not be described again here.

The arrangement of FIG. 6 shows three selectable switches, as was the case in FIG. 5. One switch can enable the known data sequences of the training signals to be supplied to the mixer. The other two switches allow the summation and complex phase measurement circuits to be bypassed.

The arrangement of FIG. 6 can operate as described in connection with the arrangement of FIG. 2. This mode of operation is when the three switches are in position A. However, with the switches in position B, the arrangement of FIG. 6 can operate as did prior art frequency lock detectors. Thus the two modes of operation of the arrangement of FIG. 6 are selectable in dependence on the positions of the three switches of the arrangement. The mode selection can be performed as explained above in connection with FIG. 5.

The three switches of FIG. 6 can equally well be applied to the arrangement of FIG. 4.

I claim:

1. A frame timing lock detector circuit for a digital communications system, said frame timing lock detector circuit comprising:

a) means for extracting known data sequences from a received signal;

b) means for supplying a reference signal, said reference signal comprising symbols of said known data sequences raised to a power of 4k+3, where k is zero or an integer;

c) a multiplier receiving said reference signal at a first input, and said known data sequences extracted from said received signal at a second input;

d) a phase measurement circuit connected to an output of said multiplier for measuring a phase of a signal output by said multiplier; and e) a detection circuit, connected to an output of said phase measurement circuit, for comparing an average of an absolute value of the measured phase with a threshold, thereby detecting correct frame timing lock.

2. The frame timing lock detector circuit of claim 1, wherein k=0, whereby the reference signal comprises the symbols of said known data sequences raised to the power of 3 or 'cubed'.

3. The frame timing lock detector circuit of claim 1, wherein said detection circuit is adapted to perform detection over said known data sequences in a single slot of said received signal, whereby an indication of correct frame timing lock is possible from a first slot received.

4. The frame timing lock detector circuit of claim 1, wherein said detection circuit comprises, in sequence, an absolute value detection circuit, an averaging circuit and a threshold detection circuit.

5. The frame timing lock detector circuit of claim 4, wherein said threshold detection circuit detects lock by comparing the average of the absolute value of said measured phase with a threshold value between $\pi$ radians and $\pi/2$ radians, or equivalent measure of phase, and wherein said detection circuit is preferably adapted to employ hysteresis in said threshold detection.

6. The frame timing lock detector circuit of claim 1, wherein a frequency correction circuit precedes said means for extracting the known data sequences from said received signal.

7. The frame timing lock detector circuit of claim 1, wherein means are provided to supply said multiplier optionally with said known data sequences, instead of said known data sequences raised to the power of 4k+3, and simultaneously to by-pass said phase measurement circuit.

8. The frame timing lock detector circuit of claim 1, wherein said known data sequences comprise said training sequences of a Time-Division Multiple Access (TDMA) signal.

9. A communications receiver comprising a frame timing lock detector circuit in accordance with claim 1.

10. A method of frame timing lock detection for a digital communications system, said method of frame timing lock detection comprising:

a) extracting known data sequences from a received signal;

b) supplying a reference signal, said reference signal comprising symbols of said known data sequences raised to the power of 4k+3, where k is zero or an integer;

c) multiplying together, in a multiplier, said reference signal and said known data sequences extracted from said received signal;

d) measuring a phase of an output of said multiplier; and e) comparing an average of an absolute value of said measured phase with a threshold, thereby detecting correct frame timing lock.

11. A frequency lock detector circuit for a digital communications system, said frequency lock detector circuit comprising:

a) means for extracting known data sequences from a received signal;

b) means for supplying a reference signal, said reference signal comprising symbols of the known data sequences raised to the power of 4k+3, where k is zero or an integer;
c) a multiplier receiving said reference signal at a first input, and said known data sequences extracted from said received signal at a second input;
d) a summation circuit connected to an output of said multiplier for summing I-components and for summing Q-components of signals output by said multiplier;
e) a complex phase measurement circuit connected to an output of the summation circuit for measuring a value of a complex phase difference between said reference signal and said known data sequences extracted from said received signal;
f) a detection circuit, connected to an output of the phase measurement circuit, for comparing said average of said absolute value of said measured complex phase difference with a threshold, thereby detecting correct frequency lock.

12. The frequency lock detector circuit of claim 1, wherein k=0, whereby said reference signal comprises the symbols of said known data sequences raised to the power of 3 or 'cubed'.

13. The frequency lock detector circuit of claim 11, wherein said complex phase measurement circuit is adapted to provide one measured value of said complex phase difference for said known data sequences in each slot of said received signal.

14. The frequency lock detector circuit of claim 11, wherein said averaging circuit provides a value of said complex phase difference averaged over a plurality of slots of said received signal.

15. The frequency lock detector circuit of claim 11, wherein said detection circuit comprises, in sequence, an absolute value detection circuit, an averaging circuit and a threshold detection circuit.

16. The frequency lock detector circuit of claim 11, wherein said detection circuit detects lock by comparing said average of said absolute value of said measured complex phase difference with a threshold value of $\pi-\phi1$ radians, or equivalent measure of phase, where $\phi1$ is a predefined acceptable value of frequency offset, and wherein said detection circuit is preferably adapted to employ hysteresis in said threshold detection.

17. The frequency lock detector circuit of claim 11, wherein said known data sequences comprise training sequences of a Time-Division Multiple Access (TDMA) signal.

18. The frequency lock detector circuit of claim 11, wherein a frequency correction circuit precedes said means for extracting said known data sequences from said received signal.

19. The frequency lock detector circuit of claim 11, wherein means are provided to supply said multiplier optionally with said known data sequences, instead of said known data sequences raised to the power of 4k+3, and simultaneously to by-pass said summation- and complex phase measurement circuits.

20. A communications receiver comprising a frequency lock detector circuit in accordance with claim 11.

21. A method of frequency lock detection for a digital communications system, said method of frequency lock detection comprising:
a) extracting known data sequences from a received signal;
b) supplying a reference signal, said reference signal comprising symbols of said known data sequences raised to the power of 4k+3, where k is zero or an integer;
c) multiplying together, in a multiplier, said reference signal and said known data sequences extracted from said received signal;
d) summing I-components and summing Q-components of signals output by said multiplier;
e) measuring a value of complex phase difference between said reference signal and said known data sequences extracted from said received signal;
f) comparing an average of an absolute value of said measured complex phase difference with a threshold, thereby detecting correct frequency lock.

* * * * *

UNITED STATES PATENT AND TRADEMARK OFFICE
CERTIFICATE OF CORRECTION

PATENT NO. : 6,658,075 B1  
DATED : December 2, 2003  
INVENTOR(S) : Andrew J. Aftelak It is certified that error appears in the above-identified patent and that said Letters Patent is hereby corrected as shown below:

<u>Title page,</u>  
Item [57], ABSTRACT,  
Line 1, please change from "A frame timing lock detector circuits and a methods of frame" to -- A frame timing lock detector circuit and a method of frame --

<u>Column 13,</u>  
Line 22, please change from "The frequency lock detector circuit of claim 1" to -- The frequency lock detector circuit of claim 11 --

Signed and Sealed this

Fourth Day of May, 2004

JON W. DUDAS  
*Acting Director of the United States Patent and Trademark Office*